(12) United States Patent  (10) Patent No.: US 7,264,265 B2
Shapiro  (45) Date of Patent: Sep. 4, 2007

(54) REMOVABLE AND STOWABLE WHEEL STANDS FOR CONVERTIBLE CHILDREN'S CARRIER DEVICES

(76) Inventor: Richard N. Shapiro, 1294 Diamond Springs Rd., Virginia Beach, VA (US) 23455

( * ) Notice: Subject to any disclaimer, the term of this patent is extended or adjusted under 35 U.S.C. 154(b) by 337 days.

(21) Appl. No.: 10/699,129

(22) Filed: Mar. 16, 2005

(65) Prior Publication Data

US 2005/0173894 A1  Aug. 11, 2005

Related U.S. Application Data

(60) Continuation-in-part of application No. 09/604,769, filed on Jun. 28, 2000, now Pat. No. 6,581,945, and a division of application No. 10/323,892, filed on Dec. 20, 2002, now Pat. No. 6,916,028.

(51) Int. Cl.
   *B62B 7/06* (2006.01)
(52) U.S. Cl. ...................... 280/643; 280/827
(58) Field of Classification Search ............ 280/39, 280/651, 659, 47.34, 79.11, 79.4, 40, 652, 280/43, 43.13, 38, 43.17, 33.994, 35, 37; 188/19, 4 R, 216, 2 D, 166
   See application file for complete search history.

(56) References Cited

U.S. PATENT DOCUMENTS 2,587,688 A * 3/1952 Bosk ............................ 280/39

| | | | |
|---|---|---|---|
| 3,272,527 A * | 9/1966 | Martin | 280/33.994 |
| 3,652,103 A * | 3/1972 | Higgs | 280/33.994 |
| 3,719,370 A * | 3/1973 | Gintick et al. | 280/33.994 |
| 5,464,237 A * | 11/1995 | Saporiti | 280/30 |
| 6,271,755 B1 * | 8/2001 | Prather et al. | 340/568.5 |
| 6,338,493 B1 * | 1/2002 | Wohlgemuth et al. | 280/30 |
| 6,378,883 B1 * | 4/2002 | Epstein | 280/250.1 |
| 7,118,115 B2 * | 10/2006 | Abel | 280/43.13 |

* cited by examiner

*Primary Examiner*—Christopher P. Ellis
*Assistant Examiner*—Bridget Avery

(57) ABSTRACT

The invention relates to convertible children's fun-car devices, go-carts and wheeled carriers, and provides removable and stowable wheel stands or chocks that allow for convenient conversion of such wheeled carrier devices from typical rolling devices to fixed, stationary play toys for use with infants and toddlers, typically not yet walking. The invention allows for selective resilient or screw placement of the wheel stands on two or more wheels to prevent overall device movement, and also provides that the wheel stands along with their associated wheel may further be entirely folded into the profile of the wheeled device, converting the overall fun-car into a completely flat, ultra thin profile with all parts and wheels still attached. Further, the wheel stands may instead be quickly detached from the wheels and stowed inside a compartment in the carrier device, such as in the simulated trunk or hood area. The stands may be adapted to foot, pedal, battery and motive power devices with or without fold flat wheel assemblies.

48 Claims, 5 Drawing Sheets

REMOVABLE AND STOWABLE WHEEL STANDS FOR CONVERTIBLE CHILDREN'S CARRIER DEVICES

RELATIONSHIP TO OTHER APPLICATIONS

This application is a continuation-in-part of U.S. patent application Ser. No. 09/604,769 filed on Jun. 28, 2000 now U.S. Pat. No. 6,581,945, as well as divisional application Ser. No. 10/323,892 filed on Dec. 20, 2002 now U.S. Pat. No. 6,916,028.

Shapiro's previous U.S. Applications include Ser. No. 09/271,274 filed on Mar. 17, 1999, now U.S. Pat. No. 6,220,611, granted Apr. 24, 2001.

FIELD OF INVENTION

The present invention relates to removable and stowable wheel stands or chocks that allow for convenient conversion of child's fun cars and various related wheeled carrier devices from rolling devices to fixed, non-rolling devices for use with infants and toddlers at a stage in life where parents do not desire that the fun car device roll but rather desire that the infant or toddler play with said device where it is in a stationary status. The invention allows for selective removal of the wheel stands from one or more wheels of said devices, and also provides that the wheel stands may be fully stowed while connected to a wheel and/or stowed when detached from said wheel, in a compartment that is part of the carrier device itself.

BACKGROUND OF THE INVENTION

In continuation-in-part U.S. application Ser. No. 09/604,769, filed on Jun. 28, 2000, and a divisional application Ser. No. 10/323,892, filed on Dec. 20, 2002, applicant disclosed new and unique methods to provide for children's fun cars and carrier devices which are convertible between a fold-flat condition and an operative condition where the child may play with the device and move it along a rolling surface. There is a desire among parents as well as toy manufacturers to provide for a longer life for infant and toddler toys such that the toys may be used during different stages of a child's life. Moreover, consumers also demand products that can fold flat. This particular invention allows for removable and stowable wheel stands so that parent has further options for a child's toy device such that when a parent desires to use such a device in a status where it is stationary, one or more wheel stands may be applied to the existing wheel of the fun car. The fun car is then convertible to where the wheel and wheel stand may both fold into a flat profile for storage or transport. The invention allows for the wheel stands to be folded when attached to a wheel or tire, or alternatively allows the wheel stand to be detached and stowed to a compartment in the vehicle itself. Further, when the toddler reaches a stage where the parent would like to use the convertible device on a rolling basis, the parent may stow the wheel stand or discard the wheel stand and simply use the device as a child's rolling fun car. The overall device may also be convertible to a fold-flat condition where it may be stowed or transported.

SUMMARY OF THE INVENTION

This application provides refinements so that a wheel stand or chock is resiliently retained to a wheel or tire of a carrier device so that the stand prevents the device, in an operative condition, from rolling movement, allowing a parent to have the child play with the device as a stand-up, stationary toy. The invention allows the parent or consumer to also fold the device flat with the wheel stand still connected to the wheel or tire. Alternatively, the invention allows the parent to remove the wheel stand and to stow it via retention to any other part of the device, or in a compartment of the stowed device also. The invention provides for simple methods to connect the wheel stands to a typical wheel or tire and provides several alternative enhancements and refinements relating to retaining and stowing the wheel to a wheel stand, including use of a bolt or semi-permanent screws, which bolts and screws may further be used to retain the stowed stands to the carrier devices. The stowed stands also may include any suitable non-skid material or substance on the surface intended to contact the rolling surface.

Further features and advantages of the present invention will be set forth in, or apparent from, the detailed description of preferred embodiments thereof which follows:

DESCRIPTION OF THE PREFERRED EMBODIMENTS

Figure 1:
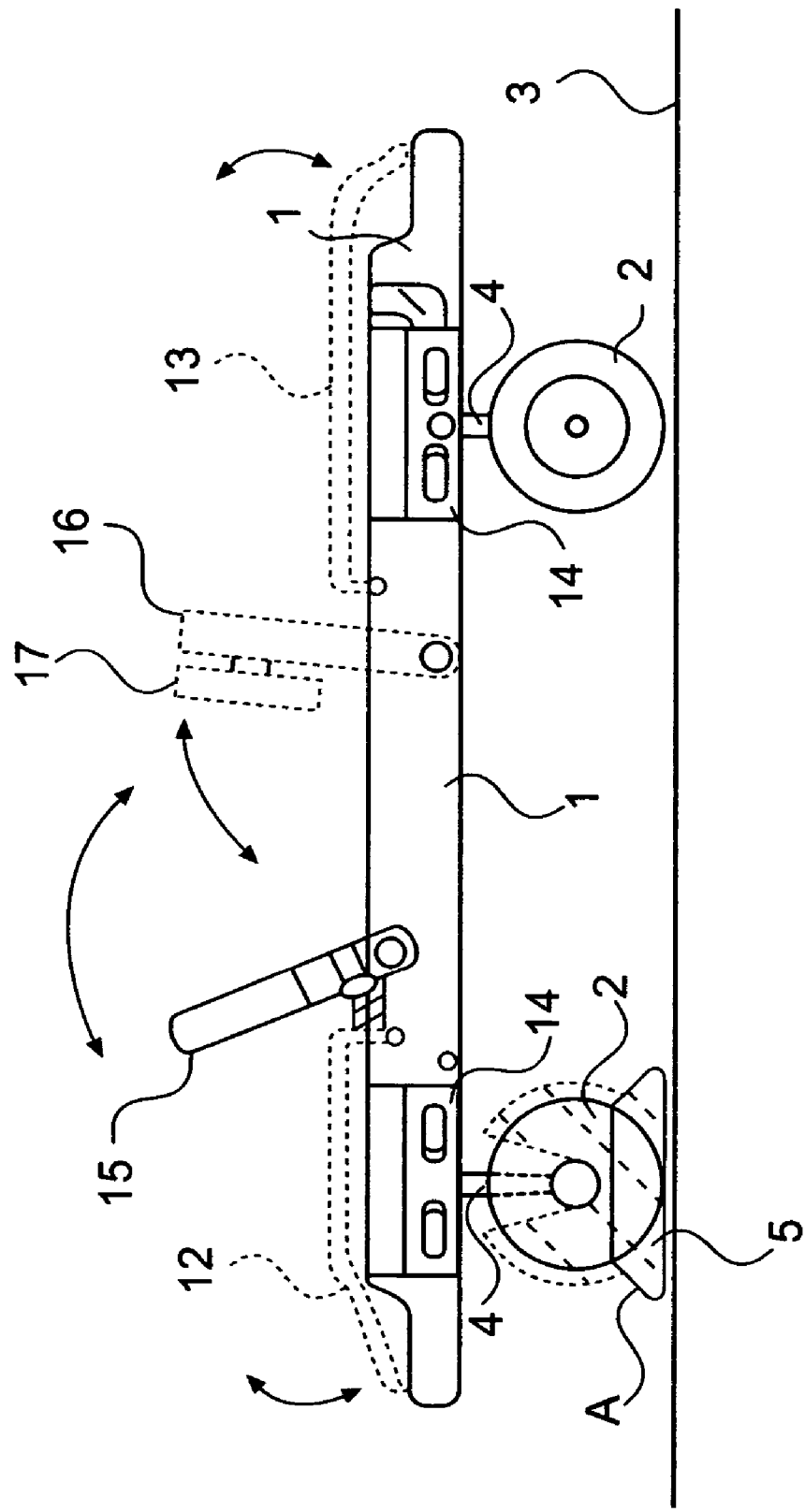
FIG. 1 is a side elevational profile of one wheel stand affixed to a convertible carrier device along the rear wheel and both FIGS. 1 and 2 together are the suggested cover figures.
Figure 2:
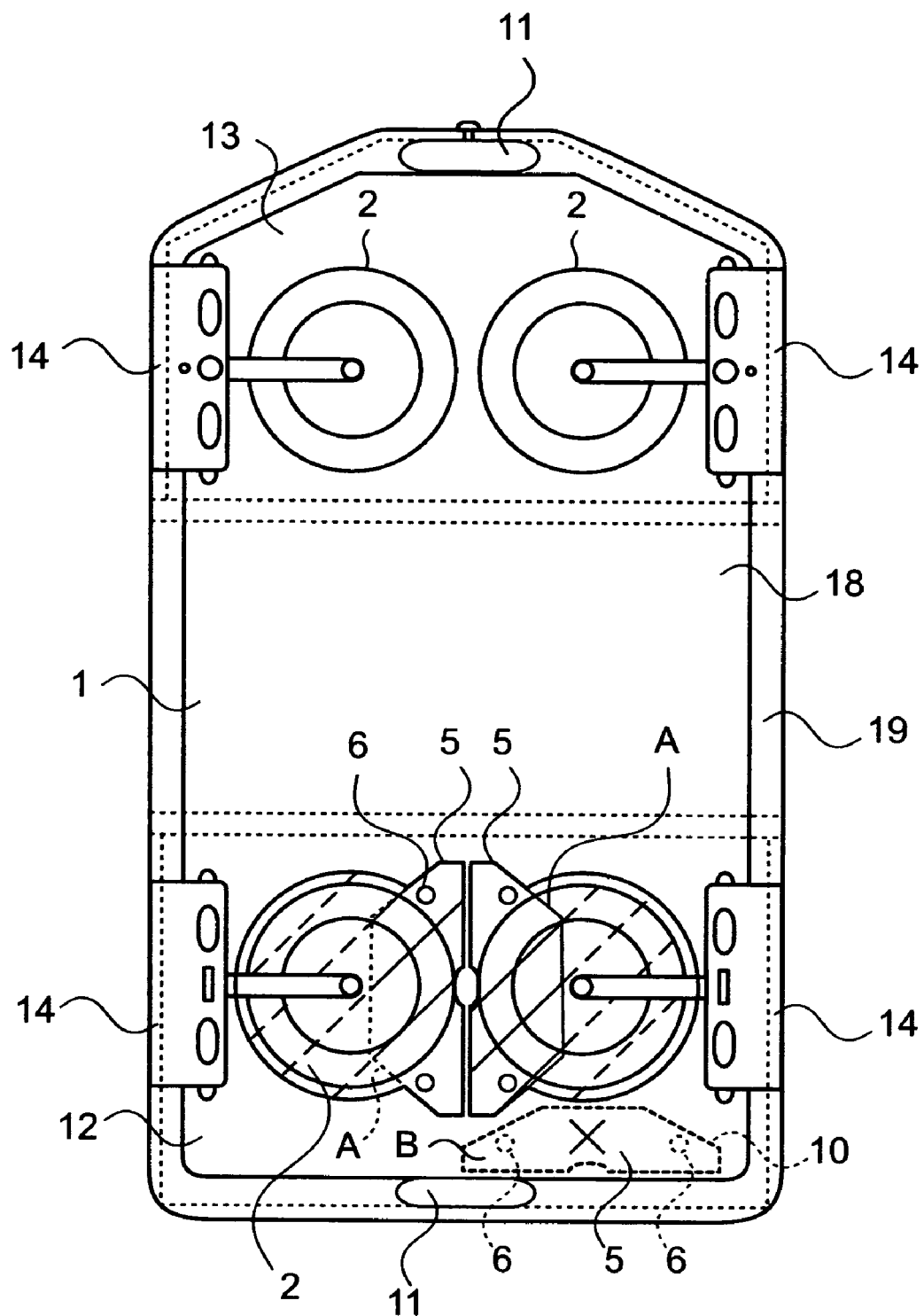
FIG. 2 is a top plan view of the fully folded convertible carrier device including the wheel stands affixed to the rear wheels, with certain attributes omitted for simplicity.

Referring to the drawings, the following are descriptions of the numbered elements included herein:

1. Carrier device
2. Wheel
3. Rolling surface
4. Axle
4A. Angled axle
5. Wheel stand
6. Finger access cavity
7. Wheel rim cavity
8. Wheel stand protrusion
8A. Wheel stand protrusion—alternate
9. Wheel stand alternate shaping
10. Carrier base protrusion
11. Panel access opening
12. Trunk lid
13. Hood lid
14. Pivoting wheel axle assembly
15. Seat back
16. Dashboard
17. Steering wheel 18. Floor
19. Bolt
20. Semi-permanent retention element
21. Nut
22. Non-skid material
X. Wheel stand storage position Referring to FIGS. 1 and 2 is shown a carrier device, 1, which is a convertible carrier device which in an operative position is a fun car carrier device which rolls along a rolling surface, and which when converted to a stowed status may be folded flat and conveniently transported, hung on a wall, etc. Though not shown here, the carrier device may operate on foot, pedal, battery or motive power. Alternatively, the device may employ fixed axle wheels (not shown).

In FIG. 1, a seat back, 15, and the typical dashboard, 16, with steering wheel, 17, are shown in an operative position. These elements fold into the side elevational profile of the device, which is not shown here. Further, in this particular embodiment, the carrier device, 1, includes four wheels, 2 (although the device may include a lesser number of wheels). One embodiment of wheel stand, 5, is shown secured to one rear tire, 2. As shown by letter "A", the stand, 5, may be of an abbreviated nature ending at line "A" or may include a more full embodiment which surrounds the main part of a tire or wheel, 2, as shown by the continuation of the ghost perspective around the wheels, 2. Any suitable axle may be utilized, although in this particular embodiment, a goose-neck type one-sided axle, 4, is shown on each of the tires, 2. The convertible carrier device, 1, includes pivoting wheel axle assemblies, 14, which may include any suitable latching method which permits the wheels to be moved from the operative position shown in FIG. 1 to a stowed position shown in FIG. 2 where the stowed wheel, 2, is moved to completely within the side elevational profile of said carrier device, 1.

Referring to FIG. 2, the wheels, 2, are shown in their stowed position, and in this particular embodiment, the innovative wheel stands, 5, are shown affixed to the rear wheels, 2, only. There are numerous embodiments of the wheel stand, 5, which may be utilized, and as shown again by the dotted line "A", the wheel stand, 5, may take an abbreviated form above-mentioned, or may instead take a form in which they surround the majority of the tire, 2, as shown by the ghost broken line perspective of stand, 5, in FIG. 2. The wheel stands may include one or more finger access cavities, 6, which allow for the user to lift and move the wheel and interconnected wheel stand conveniently from any position. In FIG. 2, letter "X" shows an abbreviated embodiment of the stand, 5, in a special detached, but stowed status in a compartment area adjacent to the floor, 18, of said carrier device, 1. In this manner, the consumer may remove the wheel stand, 5, from the position of attachment to a tire, 2, and stow it along any suitable portion of the carrier device floor, 18. Not shown are suitable protrusions (although cavities may instead be utilized), 10, which are created of a suitable portion of the floor, 18, of said device, allowing the wheel stands to be stowed without interfering with the stowing or setting up of the wheels, 2. Suitable protrusions or cavities molded from the floor or from the side wall of the carrier device, 10, (not shown) may match with any suitable protrusion or cavity on the wheel stand, 5, including a resilient connection with one or more of the finger access cavities, 6. However, as shown in FIG. 2, the entire profile of the carrier device, 1, is in an ultra-thin status and may be hung on a wall or placed for transport in the trunk of a vehicle.

Further, FIG. 2 shows, in ghost perspective, a simulated motor vehicle trunk lid, 12, as well as trunk handle opening, 11, which the user can manipulate to raise or lift the trunk lid, 12. In the embodiment shown, the wheels, 2, are mounted to axles, 4, which are in turn connected to pivoting wheel axle assemblies, 14, and the pivoting wheel axle assemblies, 14, axles, 4, and wheels, 2, are stowed under the lid of the trunk, 12. It is appreciated that instead the wheels may be stowed over the collapsed lid or under the level of the carrier device base or floor, 18. Also shown in FIG. 2 is the ghost perspective of the hood lid, 13, at the forward end of the carrier device which also includes an opening, 11. The user may lift the hood by virtue of the opening, 11, to gain access to the stowed wheels, 2, and pivoting wheel assemblies, 14.

Figure 3:
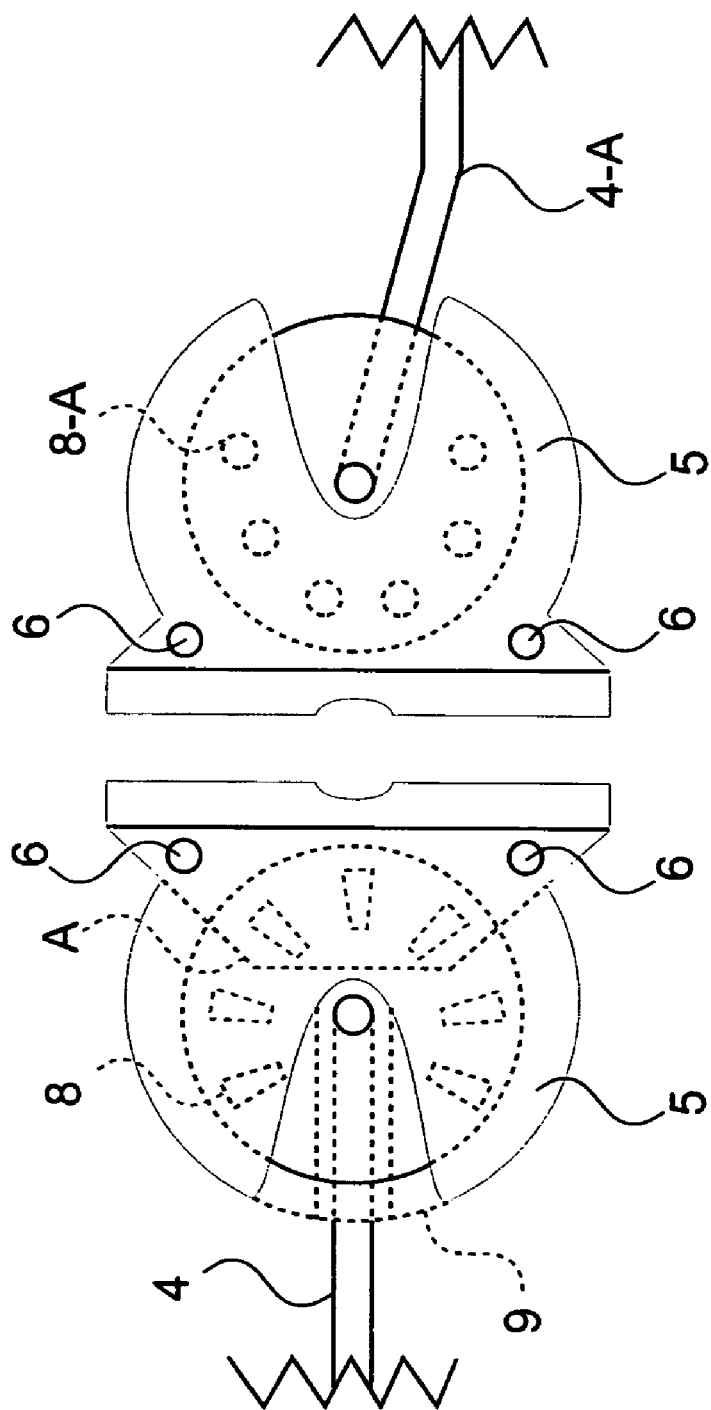
FIG. 3 is a top plan view of two rear wheels and wheel stands of the convertible carrier device depicted in FIG. 2, but broken away with further detail shown.
Figure 6:
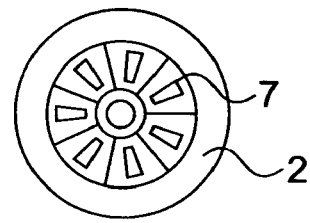
FIG. 6 is a top plan view of one side of a wheel embodiment.

In FIG. 3, there is a detached, broken-away perspective of the wheels, 2, and a broken line perspective shows a wheel axle perspective, 4, and alternate shaped wheel axle, 4-A. A pair of wheel stands, 5, are shown affixed to said wheels, 2. In one of the wheel stands, 5, there is shown a broken lined area denoted "A" which shows that the wheel stand, 5, may alternately be of a more abbreviated design along the line "A" and still include the flat aspect and the connection to the wheel, 2. Each of the wheel stands, 5, also include openings or holes, 6, which allow for finger access cavities in order to allow the user to manipulate the wheel stands when affixed to the tires, 2. FIG. 3 shows two distinct methods by which the wheel stands, 5, may be connected to a typical wheel, 2. One side of the wheel stand may include protrusions (or alternately cavities) which cause resilient contact with matching protrusions or cavities of the associated wheel, 2. Accordingly, protrusions in the wheel stand, 5, may match with cavities on a wheel, 2, such as shown at FIG. 6 as included with the recess shown at 7. As is also shown in FIG. 3 an alternate shape or form of protrusion of the wheel stand, 5, is shown at 8-A. Further, as shown by the indication at 9, the wheel stand, 5, may be continued into a round shape on the side furthest away from the flat aspect of the wheel stand. If such a shaping is included as shows at ghost perspective, 9, the shaping may proceed around the wheel axle itself since the wheel stand, 5, is designed to stop rolling rotation of the wheel, 2.

Figure 4:
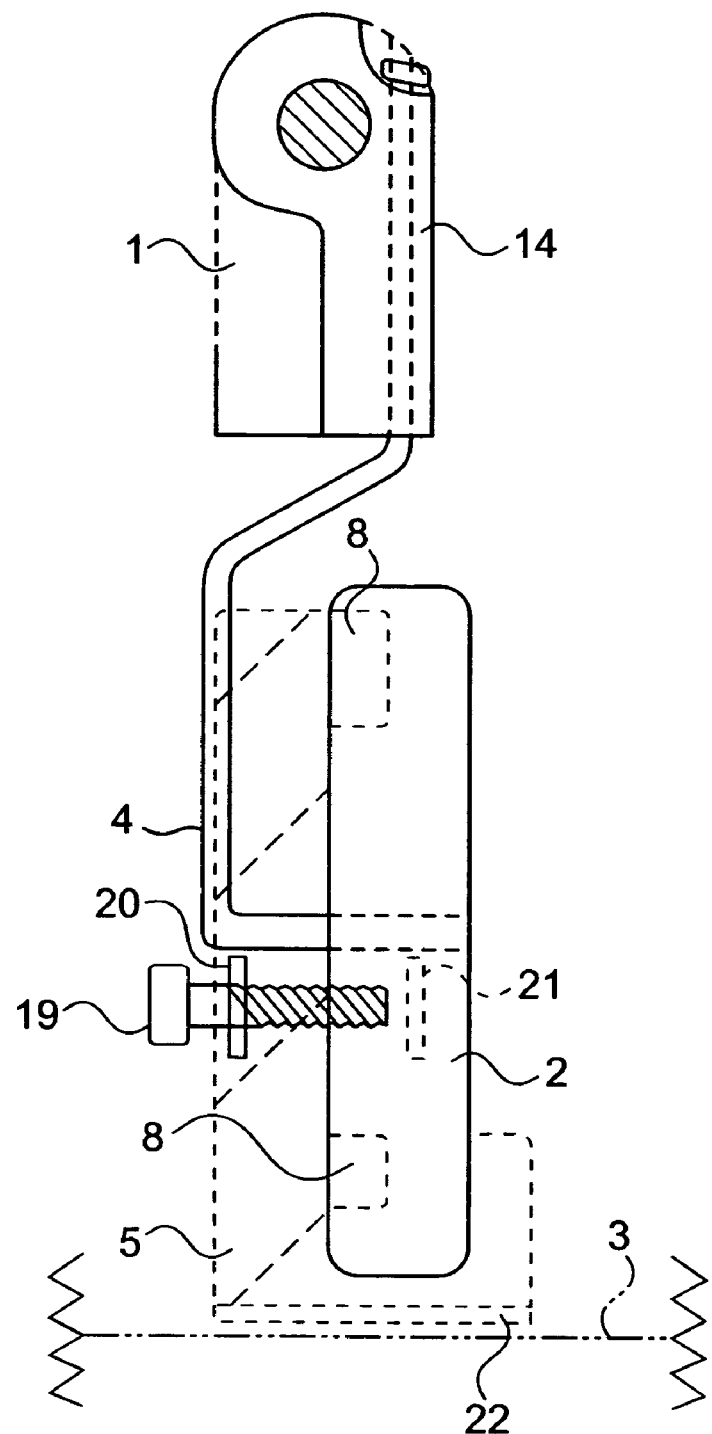
FIG. 4 is an end elevational view, partly in cross section, focusing on the pivoting wheel assembly and wheel stand.

FIG. 4 shows an end elevational view of a wheel, 2, and a ghost perspective of one embodiment and shape of a wheel stand, 5, with the lowest, flattened aspect of the wheel stand adjacent to the rolling surface, 3, which may include any suitable non-skid material, 22, glued on or affixed to the wheel stand by any suitable method, including screws. At least two wheel stand protrusions, 8, are shown although any particular series (of mail-female retention elements) may be employed to resiliently retain the wheel stand, 5, to an associated wheel, 2. The wheel stand is closely adjacent to the axle, 4, in FIG. 4 and thus there may be resilient contact between a portion of the axle if desired. In this perspective, the axle is shown traveling inside the pivoting wheel axle assembly, 14, by ghost perspective. A portion of the wall or floor of the carrier device is shown at 1 in this figure. FIG. 4 also shows that one or more bolts, 19, may be employed and mounted to, or passed through, the wheel stand, 5, to secure the stand, 5, to a wheel, 2. A bolt semi-permanent retention element, 20, (like a resiliently applied washer) may surround the bolt, 19, and retain it to the stand, 5, and the bolt, 19, may snap, rotate, or screw into the stand, 5, and a further nut, 21, may optionally be applied if a cavity is opened through the wheel, 2.

Figure 5:
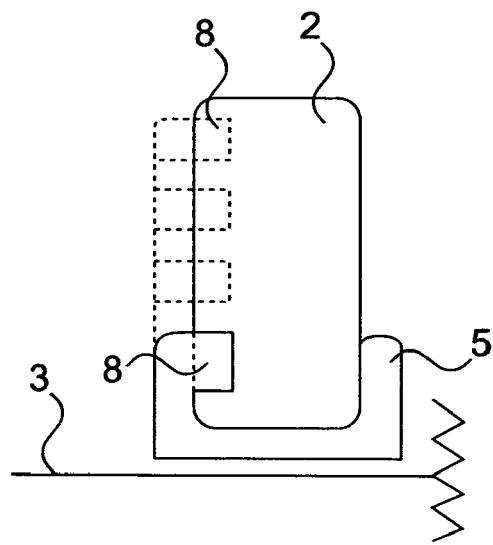
FIG. 5 is a further end elevational view, focusing on the wheel stand and wheel and the connection method for the wheel stand.
Figure 7:
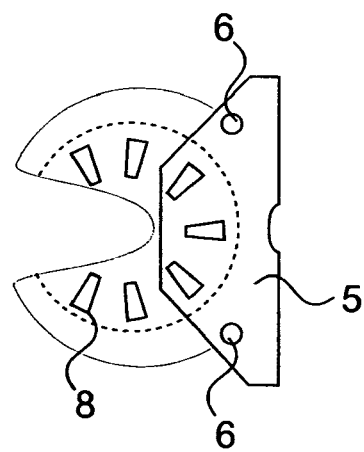
FIG. 7 is a top plan view of a wheel stand, highlighting certain features.

In regard to FIGS. 5, 6, and 7, different perspectives are shown of the wheel, 2, and/or wheel stands, 5. FIG. 5 again shows a detached perspective of a wheel, 2, the wheel stand, 5, and a series of protrusions from the wheel stand, 8, are in contact with the wheel, 2. Also the wheel stand, 5, is in contact with the rolling surface, 3, preventing rolling motion of the wheel 2. FIG. 6 is a top plan view of one wheel embodiment, 2, showing a series of cavities, 7, to which the wheel stand, 5, interconnects (wheel stand not shown in FIG. 6). FIG. 7 again shows one embodiment of a wheel stand, 5, finger access cavities, 6, and another portion of the wheel stand which includes a series of protrusions, 8, which resiliently hold the wheel stand, 5, to an associated wheel, 2.

It is appreciated that the general shape of the wheel stands may be modified in a number of particulars and so long as the wheel stand includes a flat aspect which prevents rolling movement of a tire, and so long as the shape of the wheel stand also permits retention of the wheel stand to the associated tire, any other alternative shape of the wheel stand may be employed. Also, two or more wheel stands may be included. Also, FIG. 2 shows one potential location for a wheel stand that has been removed from an associated wheel, 2, and stowed in a position toward the rear of the carrier device. Any suitable location for the detached wheel stand may be utilized, including a location anywhere else on the top surface of the carrier device or in another location adjacent to any part of the base member whether above or below the floor of the carrier device. The stands are shown in combination with stowable wheels, but may be used in conjunction with other fixed axle, non-foldable wheeled devices as well. Further, although not shown, an opening may be molded from the device floor to permit a user's legs to pass through to the rolling surface to allow foot propulsion.

What is claimed is:

1. A carrier device for children which, when erected, simulates the appearance of a motor-driven vehicle said device comprising:

a base member including a plurality of formed, upwardly projecting stub walls, defining a side elevational profile and an outer perimeter; and a plurality of simulative motor vehicle components;

a seat component which serves at least partly as a seat for at least one occupant of the carrier device;

at least two wheel assemblies affixed on opposite sides of said carrier device stub walls, each of said wheel assemblies including a movable wheel axle housing, a wheel attaching means and wheel defining a plane, and each of said at least two movable wheel axle housings are mounted within, and occupy at least part of, both the side elevational and stub wall profile of the device and incorporate at least part of at least one of said wheel's attaching means;

and said wheel assemblies each being movable between a first, latched operative position wherein said wheels are erected to provide rolling support for said carrier device and wherein the plane defined by each of said wheels extends substantially orthogonally to the side elevational profile of the carrier device, and a second, stowed, latched position, the plane defined by each of said wheels being swept through an angle during movement of said wheel assemblies between said first and second positions such that the plane defined by each of said wheels in the second position of said wheel assemblies extends substantially parallel with the side elevational profile of said carrier device, and each of said wheels in the second position being disposed substantially within the outer perimeter defined by the carrier device stub walls; and releasable latching means for providing selective retention of said wheel assemblies in the first, operative and in the second, stowed position thereof; and in said first, operative, latched position said latching means at least partly move between said movable wheel axle housing and the device base member to cause engagement and release of said latch; and at least two of said wheels each further including a selectively removable wheel stand, each such wheel stand includes at least one first, wheel receiving aspect and at least one second, shaped substantially flattened aspect, and in a first, operative position the first wheel receiving aspect is attached to at least part of one associated wheel, and said, second, shaped flattened aspect is in contact with a rolling surface, such that the at least two stands attached to at least two said wheels prevent rolling movement of the associated wheels in said first, operative position of said wheels; and when said at least two wheel stands and their associated wheels are in a second, stowed, interconnected status, the wheel stands as well as their associated wheels occupy the said second, stowed position of the wheels, and in a third, stowed position, said wheel stands are detached from said associated wheel and attached to an aspect of the carrier device, substantially within the side elevational profile and outer perimeter of said device.

2. A device in accordance with claim 1 wherein the face of the substantially flattened second, shaped aspect of the wheel stand includes a friction enhancing material.

3. A device in accordance with claim 1 wherein the wheel stand attachment means include at least one selectively removable pin with incised threads and an enlarged head, which selectively removable pin retains said wheel stand to said associated wheel by screw means.

4. A device in accordance with claim 3 wherein the said removable pin passes through at least part of the wheel stand thickness, and is at least partly screwed into at least part of the surface of the associated wheel to cause retention of the two components together.

5. A device in accordance with claim 1 wherein the wheel stand, in said third, detached position, is resiliently attached to the device base member.

6. A device in accordance with claim 1 wherein said removable pin passes through said wheel stand and is at least partly screwed into the base member surface thickness, retaining said wheel stand to the base member.

7. A device in accordance with claim 1 wherein said simulative motor vehicle components include a front end portion movable between the first, position wherein the front end hood portion of a motor driven vehicle is simulated, and a second, position wherein the hood portion is moved and a storage space is accessible between the base member and said hood portion.

8. A device in accordance with claim 1 wherein said simulative motor vehicle components include a trunk portion movable between the first, position wherein the trunk portion of a motor driven vehicle is simulated, and a second position wherein the trunk portion is moved and a storage space is accessible between the base member and said trunk portion.

9. A device in accordance with claim 1 wherein said movable wheel axle housings move approximately 270° between said first and second positions.

10. A device in accordance with claim 1 wherein said movable wheel axle housings move approximately 90° between said first and second positions.

11. A device in accordance with claim 1 wherein said simulative motor vehicle components include a steering wheel.

12. A device in accordance with claim 1 wherein said device includes a handle which in a first, operative, position serves as a user handle for said device, and in a second, stowed, position is substantially parallel with and substantially within the side elevational profile of said base member.

13. A device in accordance with claim 1 wherein the simulative motor vehicle components are manually manipulable to a stowed position between the movable wheel axle housings in their second, stowed, position, and the base member.

14. A device in accordance with claim 1 wherein the simulative motor vehicle components are manually manipulable and permit the movable wheel axle housings in their second, stowed, position to be stowed substantially between said simulative motor vehicle components in their second, stowed, position and the base member.

15. A device in accordance with claim 1 wherein wheels are mounted on said base member by a movable wheel axle housing including means cooperating with said base member to provide a releasable snap-in connection between said movable wheel axle housing and said base whereby release of said snap-in connection enables movement of said wheels between said first and second positions thereof.

16. A device in accordance with claim 1 wherein at least two opposing wheels, in said second stowed positions, are at least partly overlapping.

17. A device in accordance with claim 1 wherein said simulative motor vehicle components include means for the user to illuminate at least one of said motor vehicle simulative components.

18. A device in accordance with claim 1 wherein the device includes an opening which permits a separate hook structure to pass through the said opening, permitting the stowed device to be hung from said separate hook structure.

19. A device in accordance with claim 1 wherein said carrier device is equipped with a coupler means to allow said carrier device to be coupled to a further wheeled device thereby enabling both said carrier device and said further wheeled device to move together.

20. A device in accordance with claim 1 wherein said device is configured such that at least one further said carrier device can nest thereupon in the second, stowed, position.

21. A device in accordance with claim 1 wherein the simulative motor vehicle components include at least one door at least partly mounted to said base member, which door is movable along a hinge.

22. A device in accordance with claim 1 including simulative hood and trunk compartments which a user may manipulate to access cargo stowed at least partly on the base member.

23. A device in accordance with claim 1 wherein at least one occupant's feet pass through an opening in said base member, and said occupant's feet serve to propel the device for rolling movement.

24. A device in accordance with claim 1 which includes braking means controlled by a user, which braking means causes at least one wheel to cease rotation along its central axis of rotation, when at least said one wheel is in the first, operative position.

25. A device in accordance with claim 1 wherein at least one beverage container opening on the base member allows for retention of a beverage within said opening.

26. A device in accordance with claim 1 wherein at least one wheel of said wheel assemblies includes an outer rim and a central hub and the hub including a transverse opening therein, and said movable wheel axle housing for said at least one wheel including a wheel support axle, and the elongate wheel support axle having first and second ends, the wheel support axle including a transverse portion at said first end received in the opening in the hub and forming a part of said axle about which said wheel rotates, and a further portion extending orthogonally to the transverse portion and being received in said movable wheel axle housing, the further axle portion terminating in said second end, and said movable wheel axle housing including a cavity therein disposed adjacent to said second end, and said movable wheel axle housing further comprising a terminal fixing member affixed to said second end of said wheel support axle and received in said cavity, said fixing member being of size and shape relative to that of said cavity so as to prevent rotation thereof in said cavity, whereby axial rotation of said further portion is prevented and thus said at least one wheel is prevented from rotation about said further portion and is limited to rotation about an axis formed by said transverse portion.

27. A device in accordance with claim 1 further comprising a simulated trunk component movable into a second, non-stowed position which allows an occupant to be seated in a seat area at least partly on top of the area of the base, said seat area being at least partly below the area occupied by the trunk component when said trunk component occupies a first, stowed position simulating a vehicle trunk.

28. A device in accordance with claim 1 wherein a panel is movable on the base member to close and open a space through which an occupant may pass their legs when the wheel assemblies of said carrier device are in a first, operative, position.

29. A device in accordance with claim 1 wherein at least one of said wheels of said wheel assemblies, in the operative position, rotates on its axle approximately 360 degrees in relation to the rolling surface.

30. A device in accordance with claim 1 wherein components comprising a simulative dashboard and steering means are manipulable from a first, operative, position simulating a motor vehicle dashboard, to a second, stowed, position parallel with, and substantially within the side elevational profile of said base member.

31. A device in accordance with claim 1 wherein a handle is selectively removable from the base member.

32. A device in accordance with claim 1 wherein the simulative motor vehicle components are selectively removable from the base member.

33. A device in accordance with claim 1 wherein the simulated motor vehicle components include simulated electrical gauges on the vehicle dashboard.

34. A device in accordance with claim 1 wherein said base member, together with said plurality of wheel assemblies in the first, operative position thereof, define a further outer perimeter; and wherein said base member, together with the plurality of wheel assemblies in the second, stowed position thereof, define a smaller outer perimeter than said further outer perimeter.

35. A device in accordance with claim 1 wherein each said movable wheel axle housing includes wheel attaching means substantially vertical to the rolling surface when in the first, operative position and substantially horizontal to said rolling surface when in the second, stowed position.

36. A wheeled carrier device according to claim 1 wherein the releasable latching means, for latching in said first and second positions, are one and the same means.

37. A wheeled carrier device according to claim 1 wherein the periphery of the at least two wheels, in the first operative position, is substantially beneath the bottommost plane of the base member.

38. A wheeled carrier device according to claim 1 wherein said device has four wheels and wherein at least two of said wheels, in the operative state thereof, are rotatable in relation to the rolling surface through 360 degrees on their axle, beneath the bottommost plane of said base member.

39. A wheeled carrier device according to claim 1 wherein said movable wheel axle housing mounting means includes resilient releasable retaining means for retaining said wheels in the operative position thereof.

40. A wheeled carrier device according to claim 1 wherein said movable wheel axle housing includes a spring biased retaining means for retaining at least one said wheel in the operative position thereof and in the inoperative position thereof.

41. A wheeled carrier device according to claim 1 wherein at least one of said wheels includes a wheel attaching means mounted to said movable wheel axle housing so as to enable at least 360 degree rotation of said at least one wheel about an axis defined by said axle, when said wheel is in the first, operative position.

42. A wheeled carrier device according to claim 1 wherein said movable wheel axle housing for said at least one axle of said wheel includes means for fixating said axle against axial rotation, to prevent axial rotation of said at least one wheel.

43. A wheeled carrier device according to claim 1 wherein said movable wheel axle housing includes at least one pivot element received in an opening in said movable wheel axle housing which pivot element further interconnects to at least part of the base member stub wall.

44. A wheeled carrier device according to claim 1 wherein said movable wheel axle housing includes a cavity through which said wheel attaching means at least partly extends and a recess in one surface thereof in communication with said cavity, said device further comprising a terminal fixing member disposed in said recess and connected to one end of said wheel attaching means, the other end of said wheel attaching means being connected to said at least one wheel's axis of rotation.

45. A wheeled carrier device according to claim 1 which includes pedal propulsion means.

46. A wheeled carrier device according to claim 1 which includes battery propulsion means.

47. A wheeled carrier device according to claim 1 which includes motive power means.

48. A carrier device for children which, when erected, simulates the appearance of a motor-driven vehicle, said device comprising:
   a base member including a plurality of upwardly projecting stub walls, defining a side elevational profile and an outer perimeter; and
   a plurality of simulative motor vehicle components;
   a seat component which serves at least partly as a seat for at least one occupant of the carrier device;
   at least three wheel assemblies provide rolling support for said carrier device; and
   at least two of said wheels each further including a selectively removable wheel stand, each such wheel stand includes at least one first, wheel receiving aspect and at least one second, shaped substantially flattened aspect, and in a first, operative position the first wheel receiving aspect is attached to at least part of one wheel, and the, second, shaped flattened aspect is in contact with a rolling surface, such that the at least two stands attached to at least two said wheels prevent rolling movement of the associated wheels of said device in said first, operative position of said wheels; and in a second, stowed position, said wheel stands are detached from said associated wheel and attached to an aspect of the carrier device, substantially within the side elevational profile and outer perimeter of said device.

* * * * *